United States Patent [19]

Kato

[11] Patent Number: 5,051,990
[45] Date of Patent: Sep. 24, 1991

[54] PHASE ADJUSTMENT CIRCUIT
[75] Inventor: Tsuguo Kato, Yokohama, Japan
[73] Assignee: Fujitsu Limited, Kawasaki, Japan
[21] Appl. No.: 468,284
[22] Filed: Jan. 22, 1990
[30] Foreign Application Priority Data Jan. 20, 1989 [JP] Japan .................................. 1-009906

[51] Int. Cl.⁵ ............................................. H04J 3/06
[52] U.S. Cl. .............................. 370/105.3; 370/100.1; 370/108; 375/107
[58] Field of Search ............... 370/105.3, 100.1, 105.1, 370/105.5, 108, 103; 375/107, 111, 118, 119, 120; 455/8, 9, 10, 17, 18, 136, 139

[56] References Cited

U.S. PATENT DOCUMENTS

| | | | |
|---|---|---|---|
| 4,301,532 | 11/1981 | Janetzky | 370/103 |
| 4,426,713 | 1/1984 | Shimizu et al. | 370/108 |
| 4,451,917 | 5/1984 | De Coursey | 370/108 |
| 4,694,472 | 9/1987 | Torok et al. | 375/107 |
| 4,805,195 | 2/1989 | Keegan | 370/108 |
| 4,805,196 | 2/1989 | Cooperman et al. | 375/107 |

Primary Examiner—Douglas W. Olms
Assistant Examiner—Alpus H. Hsu
Attorney, Agent, or Firm—Staas & Halsey

[57] ABSTRACT

A phase adjustment circuit uses a broad band circuit for processing a plurality of high speed highway data comprising m bit frames. The phase adjustment circuit provides a master frame pulse based on a frame pulse selected from respective frame pulses in the high speed highway and delayed in phase by the maximum amount and provides a master clock based on a high speed highway clock corresponding to the master frame pulse. The phase adjustment circuit receives a plurality of high speed highway data by using the master clock and the master frame pulse.

11 Claims, 10 Drawing Sheets

PRIOR ART

Fig. 2 PRIOR ART

PRIOR ART

Fig. 3

PRIOR ART

PHASE ADJUSTMENT CIRCUIT

BACKGROUND OF THE INVENTION

The present invention relates to a digital exchange apparatus and more particularly, to an automatic phase control circuit in a broad range exchange apparatus for handling high speed data.

Recently, demand has arisen for a broad range exchange for processing high speed signals which include a moving image as their main component. Such a broad range exchange apparatus deals with high speed signals of several hundreds of Mb/s such as moving images, which a conventional voice range exchange apparatus does not. Thus, it is necessary for highways in respective directions to be synchronized with each other.

Figure 1A:
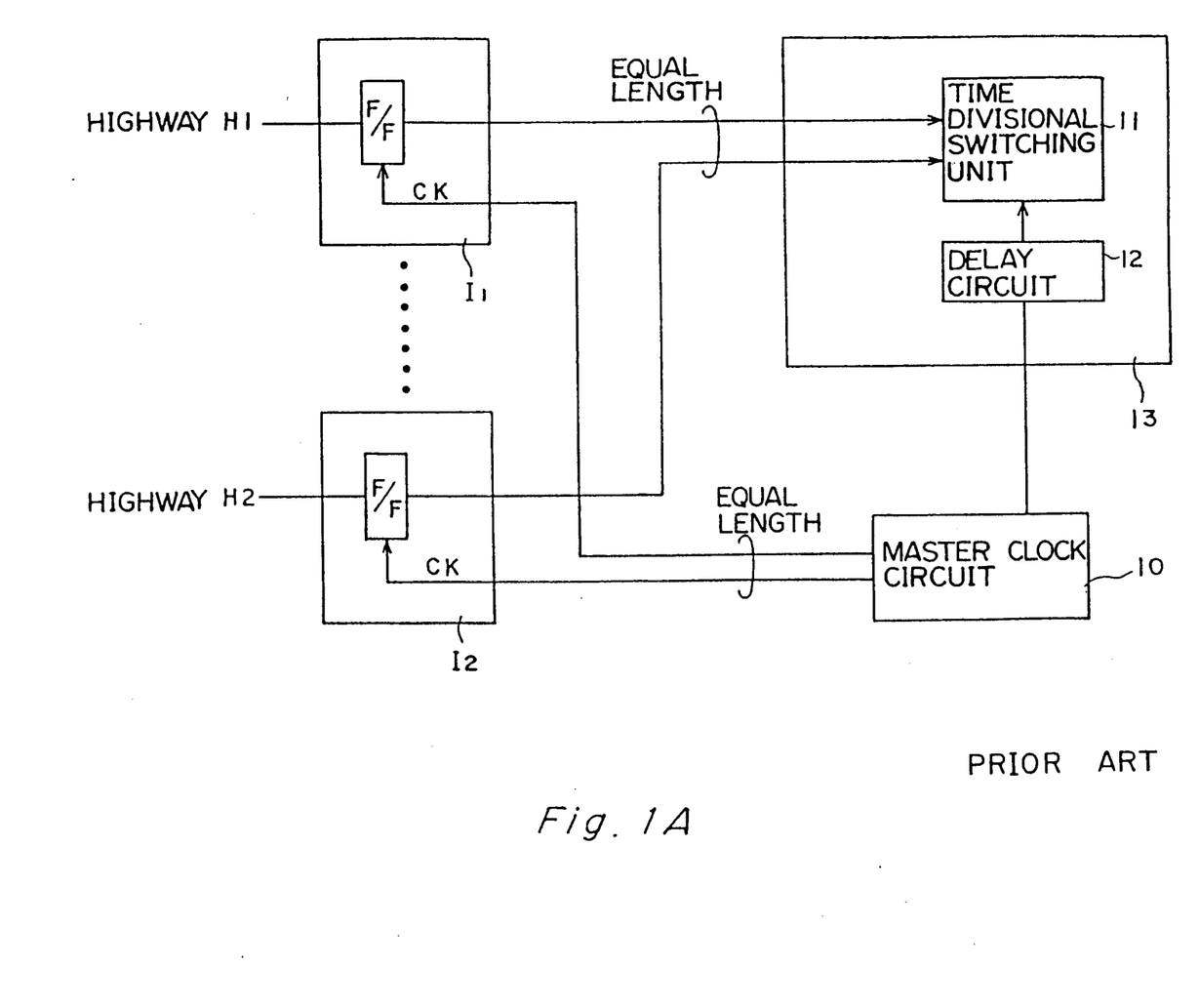
FIGS. 1A and 1B show structural views of the prior art system.
Figure 1B:
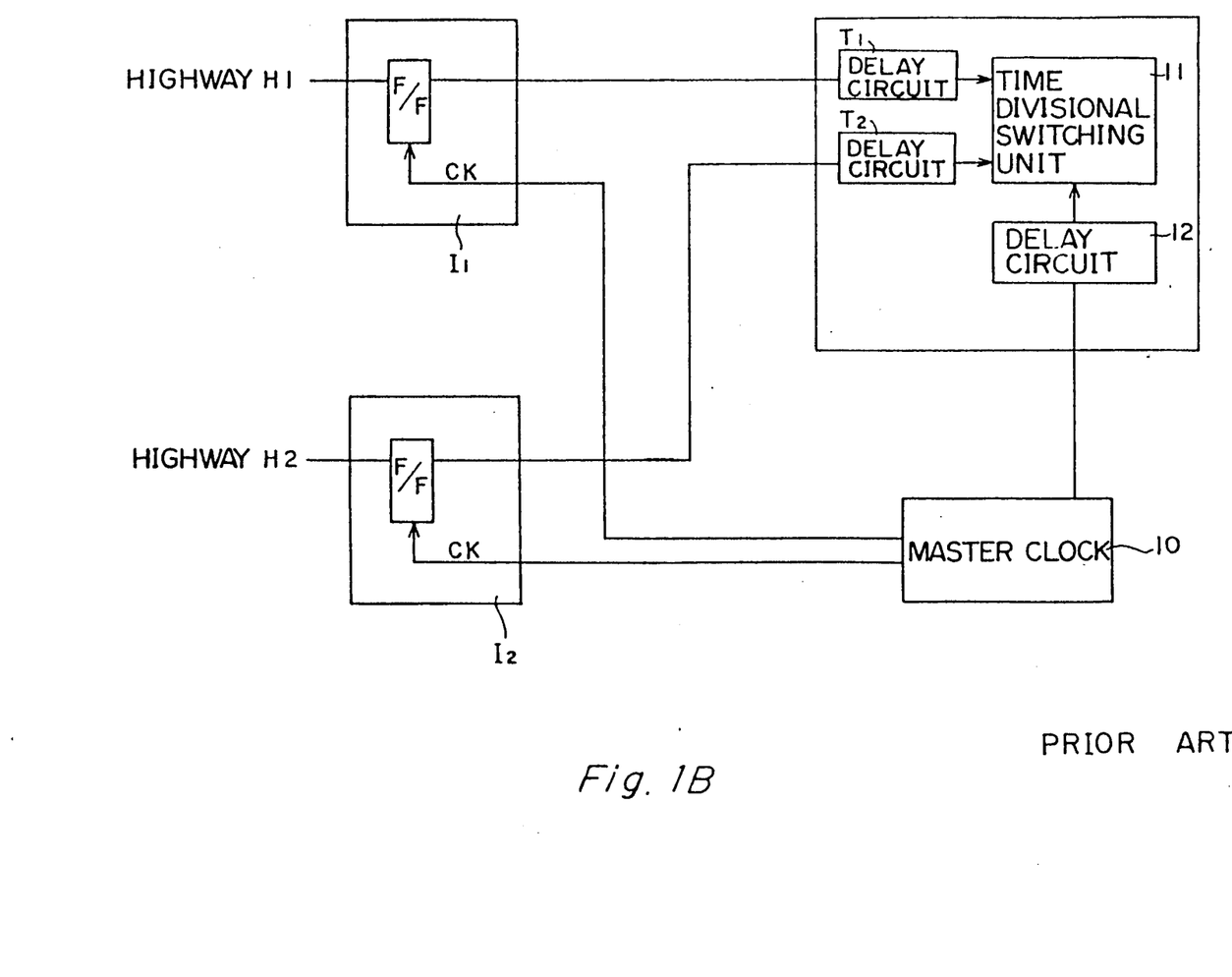

FIGS. 1A and 1B are structural views of the prior art system.

Signals are inputted from highways H1 and H2 and flip flop F/F provided within interface circuits I1 and I2 receives data at a clock CK generated from master clock circuit 10. Then, flip-flop F/F provides the output to time divisional switching unit 11. A detailed circuit is not disclosed for time divisional switching unit 11. However, the exchange of data from respective interface circuits I1 and I2 is conducted by time divisional switching unit 11.

Master clock circuit 10 controls a time divisional switch provided in time divisional switching unit 11 through delay circuit 12.

In such a system, as shown in FIG. 1A, in order to obtain a matching of signals operated in time divisional switching unit 11, the length of clock lines from master clock circuit 10 to interface circuits I1 and I2 and further the length of the data lines from flip-flops F/F within interface circuits I1 and I2 to time divisional switching unit 11 should be made the same. This is because, if the lengths of these lines are different, the timings in the time divisional switching unit 11 are different, thereby causing an error.

As shown in FIG. 1B, delay circuits T1 and T2 are provided between interface circuits I1 and I2 and time divisional switching unit 11. Data in a highway from interface circuits I1 and I2 are delayed by a predetermined time and the delay time of delay circuits T1 and T2, respectively, are different in respective channels.

In such a broad band exchange, a delay adjustment is performed by equalizing the length of the data lines and clock lines or by inserting delay circuits. The system obtained by combining apparatuses previously recited in FIGS. 1A and 1B are also reviewed.

In the above system, a delay adjustment should be conducted for respective highways H1 and H2. Thus, when the system is enlarged, such a system is not realistic.

In contrast, there is a system for providing exchange body 13 with a simple elastic function.

Figure 2:
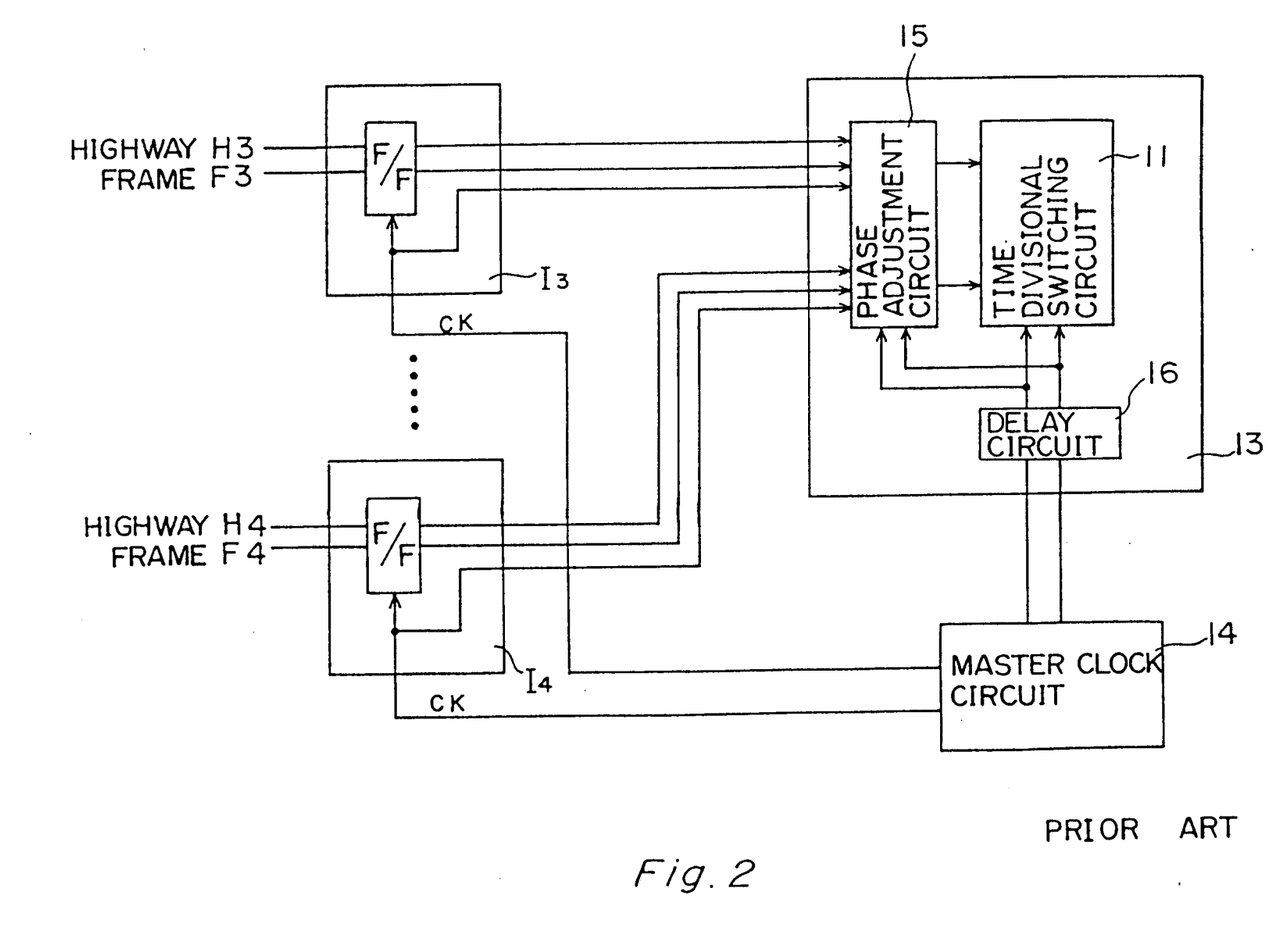
FIG. 2 shows a structural view of the prior art system.

FIG. 2 is a structural view of the prior art system. As shown in FIG. 2, respective highways H3 and H4, and frames F3 and F4, are obtained by interface circuits I3 and I4 and added to phase adjustment circuit 15 of exchange body 13. Flip-flops F/F of interface circuits I3 and I4 receive data in synchronization with a clock from master clock circuit 14. The clocks outputted from master clock circuit 14 are added in phase adjustment circuit 15 through respective interface circuits I3 and I4 and the data in respective highways H3 and H4 are matched with those based on these clocks and on frames F3 and F4, and are thereby inputted to time divisional switching unit 11.

Phase adjustment circuit 15 and time divisional switching unit 11 perform an exchange by using a clock transmitted from master clock circuit 14 through delay circuit 16. The clock in master clock circuit 14 is different from the clock applied to flip-flops F/F in interface circuits and the synchronized clock and frame pulses are transmitted via respective highways and are synchronized with the master clock and master frame pulse in phase adjustment circuit 15, thereby to perform a clock transfer operation. Thus, synchronization is achieved by a simple elastic function.

Figure 3:
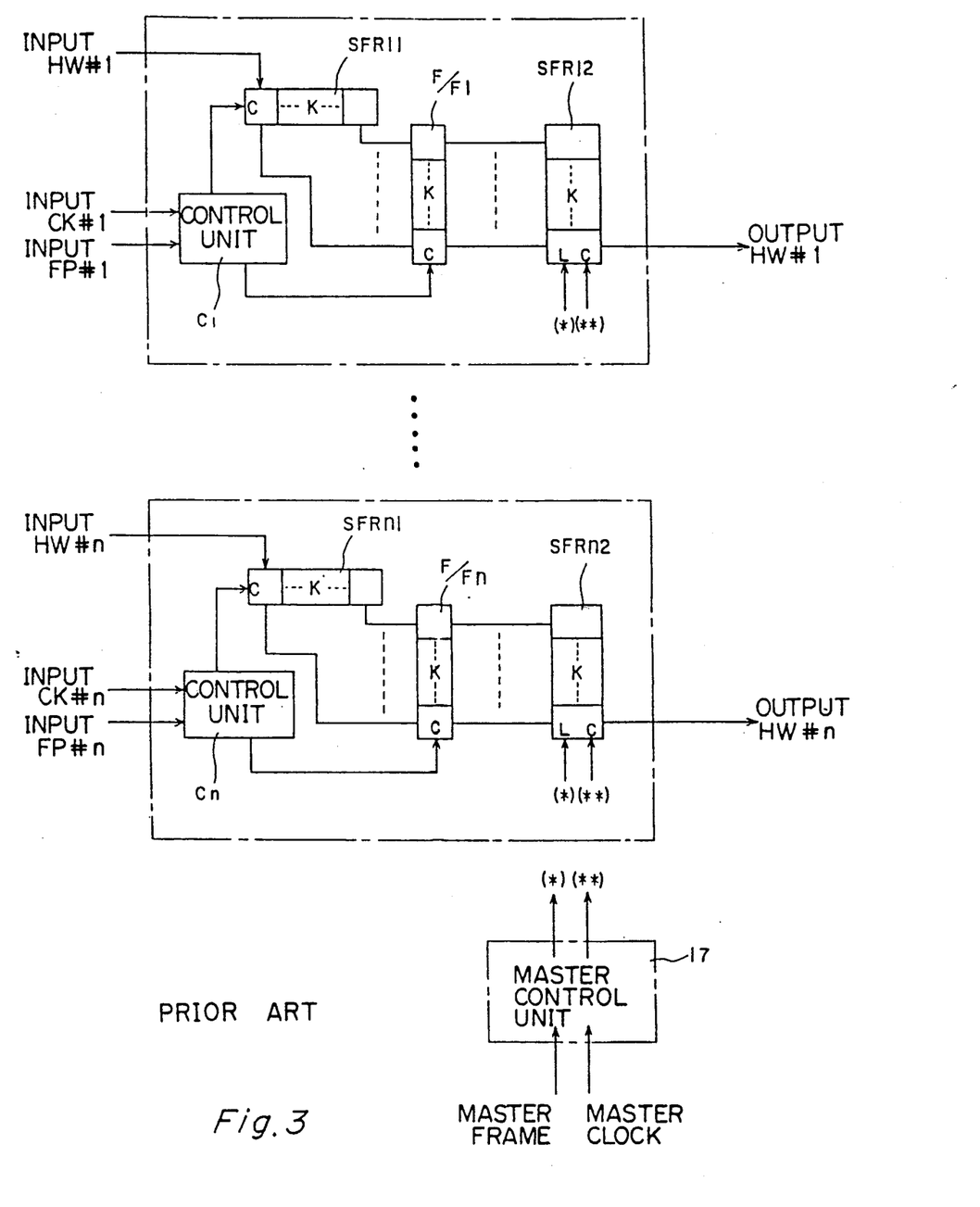
FIG. 3 shows "a detailed structural view of a prior art phase adjustment circuit"

FIG. 3 is a detailed structural view of "a prior art phase adjustment circuit"; Respective highways (input HW#1-#n) provide the data, which is inputted together with a clock and a frame pulse (input CK#1-#n-/input FP#1-#n) synchronized with respective highways. Input HW#1 is inputted to shift register SFR11 of k bits and k is sufficiently small for the number m of bits of a frame. Further, m is an integer multiplication of k. A shift clock of shift register SFR11 is input CK#1. Control unit C1 forms a latch pulse having a period of k bits from input CK#1 and input FP#1 and is inputted to flip-flop F/F1 as a clock. The speed of the signal is then 1/k in flip-flop F/F1. A similar process is applied to other highways and these shift registers operate in synchronization with a clock in respective highways.

A latch pulse (*) formed by master control unit 17 from a master clock and a master frame is inputted to shift register SFR12 with a load. The output of flip-flop F/F1 is simultaneously latched and thereafter shifted by a master clock (**). All the data of the highway is outputted as output HW#1 in a synchronized state. With the above structure, a phase difference of up to k bits can be absorbed.

Figure 4:
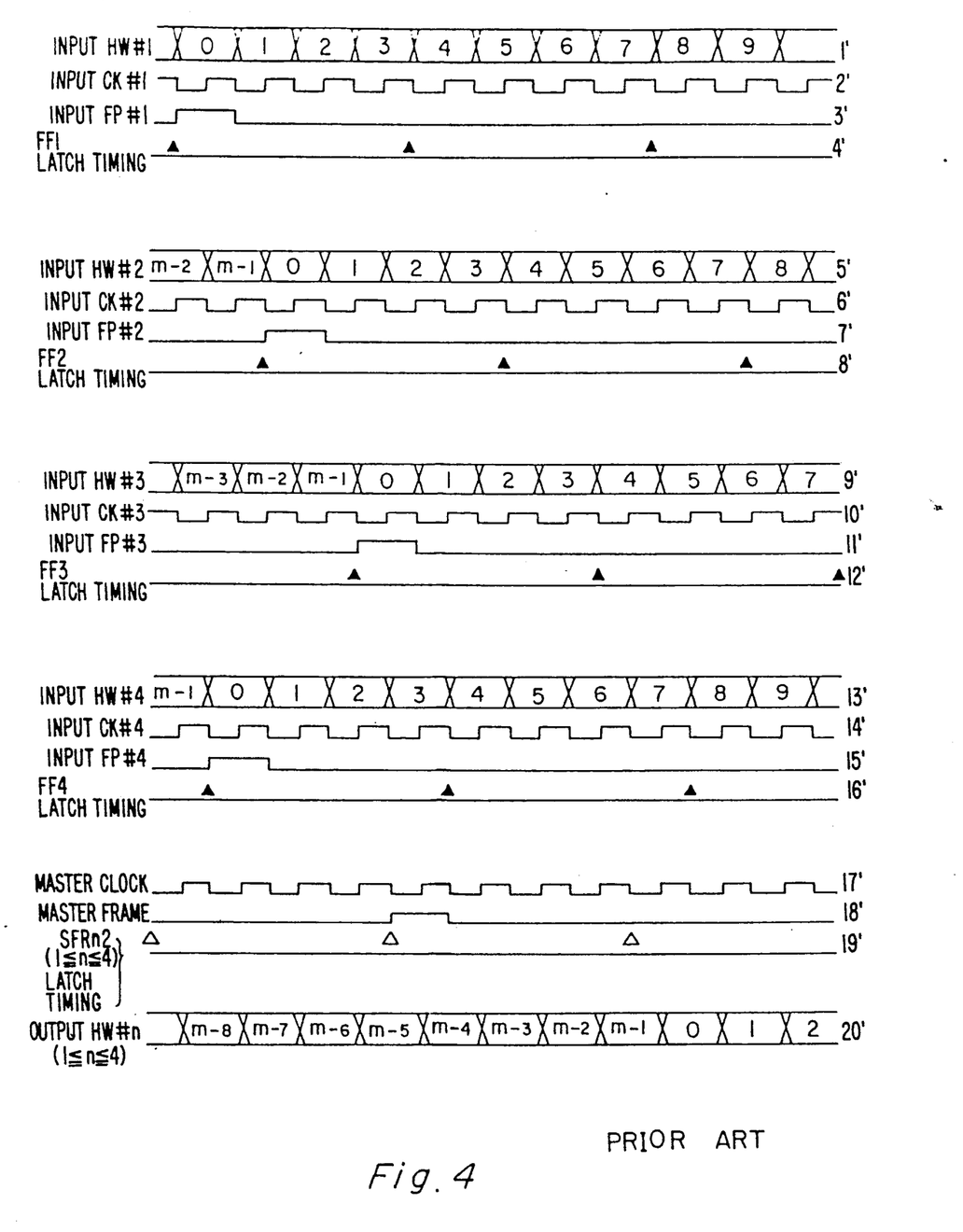
FIG. 4 shows a timing chart of "the prior art phase adjustment circuit" shown in FIG. 3.

FIG. 4 is a timing chart of the prior art phase adjustment circuit shown in FIG. 3. It shows a timing chart where k is 4 bits and n is 4. When respective inputs HW#1 to #4 are inputted at different timings, respective inputs HW#1 to #4 are applied to corresponding shift registers SFR1n and are shifted in accordance with respective individual clocks. On the other hand, respective control units C1-Cn produce respective latch pulses ④' ⑧' ⑫' ⑯ . These pulses are latched by flip-flops F/Fn and subjected to a speed conversion (serial to parallel conversion). At this time, master clock ⑰ and master frame 18' are inputted so that a latch pulse can be formed when respective frame pulses end and output HW#n is provided at a timing shown in ⑳ . Therefore, according to the above construction, phase shifting of up to k bits can be absorbed and it is not necessary to perform an equalization of a highway as shown in FIG. 1A, and the system structure's freedom is increased.

However, even where the above elastic function is provided, respective clocks should be determined in accordance with a phase of master clock ⑰ and master frame ⑱ . Therefore, there is a problem that it is necessary to perform a careful phase adjustment.

Further, when the system is expanded, the phase adjustment can be conducted by considering respective phases. Thus, if the system becomes large, such phase adjustment also becomes difficult to conduct.

SUMMARY OF THE INVENTION

An object of the present invention is to automatically perform a phase adjustment without needing to conduct any adjustment.

A feature of the present invention resides in a phase adjustment circuit using a broad band circuit for processing a plurality of high speed highway data comprising an m-bit frame comprising: parallel deploying means for converting into a parallel signal the k bits equal to the reverse of integer times m bits forming one frame; control means for producing a clock necessary for said parallel deploying means based on a clock and frame pulse with regard to respective speed highways; latch means for receiving parallel signals from said parallel deploying means; maximum delay detecting means for selecting the clock and frame pulse whose phase is most delayed, selected from the clock and frame pulse generated from said parallel deploying means and producing them as the master clock and master frame pulse; and clock generating means for generating a clock for enabling said latch means to receive the parallel signal from said parallel deploying means based on the master clock and master frame pulses applied from said maximum delay detecting means and for applying said clock to said latch means.

DESCRIPTION OF THE PREFERRED EMBODIMENT

An embodiment of the present invention will be explained by referring to the attached drawings.

Figure 5:
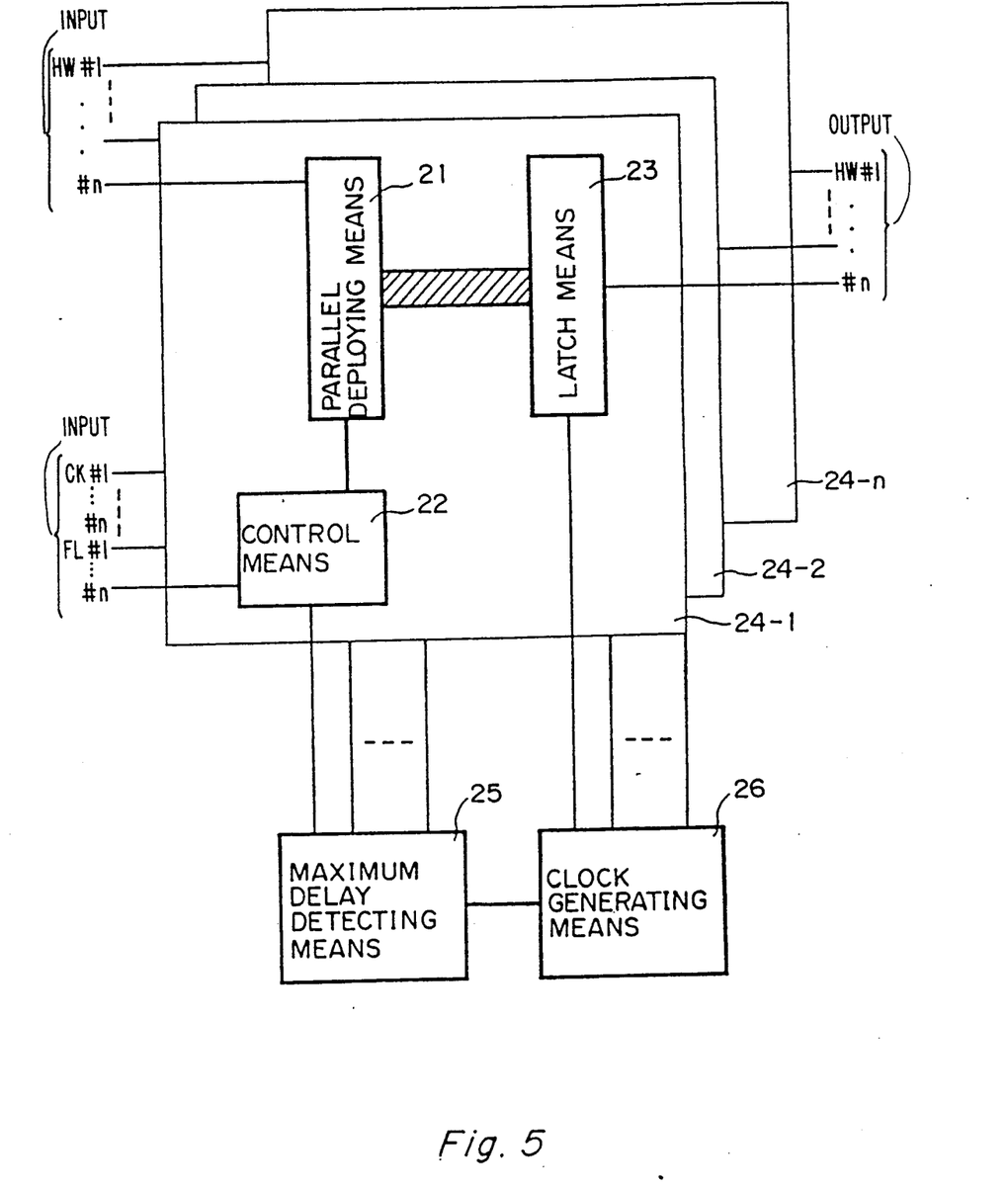
FIG. 5 shows a block diagram for explaining a principle of the present invention.

FIG. 5 shows a block diagram of the present invention. A plurality of master clock registers 24-1 to 24-n comprises parallel deploying means 21 for deploying k bits, which are the reverse of the integer times m bits forming one frame, into a parallel signal, control means 22 for generating a clock necessary for said deploying means 21 based on the clock and the frame pulse of respective high speed highways, and latch means 23 for latching the parallel deploying signal obtained from said parallel deploying means 21.

The maximum delay detecting means 25 selects the clock and frame pulse whose phase is most delayed, from those clocks and frame pulses generated from control means 22 provided by said plurality of master clock registers 24-1 to 24-n, and outputs them as a master clock and master frame pulse.

Clock generating means 26 generates a clock for enabling the latch means 23 to obtain a parallel signal from the parallel deploying means 21 by using a master clock and master frame pulse added from maximum delay detecting means 25 and adds the clock to the latch means 3 of master clock registers 24-1 to 24-n.

The block diagram shown in FIG. 5 operates as follows.

Parallel deploying means 21 provided in master clock registers 24-1 to 24-n receives data of a highway in accordance with a clock generated by respective control means 22 and converts them into parallel data. Maximum delay detecting means 25 detects the clock and frame pulse whose phase is most delayed, from those generated from control means 22 and adds them to clock generating means 26 as a master clock. Clock generating means 26 generates these pulses whose phase is most delayed and applies them to latch means 23. Parallel deploying means 21 receives data using a clock of respective highways and respective latch means 23 receives the data at the most delayed phase. Thus, even if a delay of several bits is generated in parallel deploying means 21, latch means 23 receives the data at the most delayed time. Therefore, an automatic phase control can be conducted elastically without adjusting the phase of received data.

Figure 6:
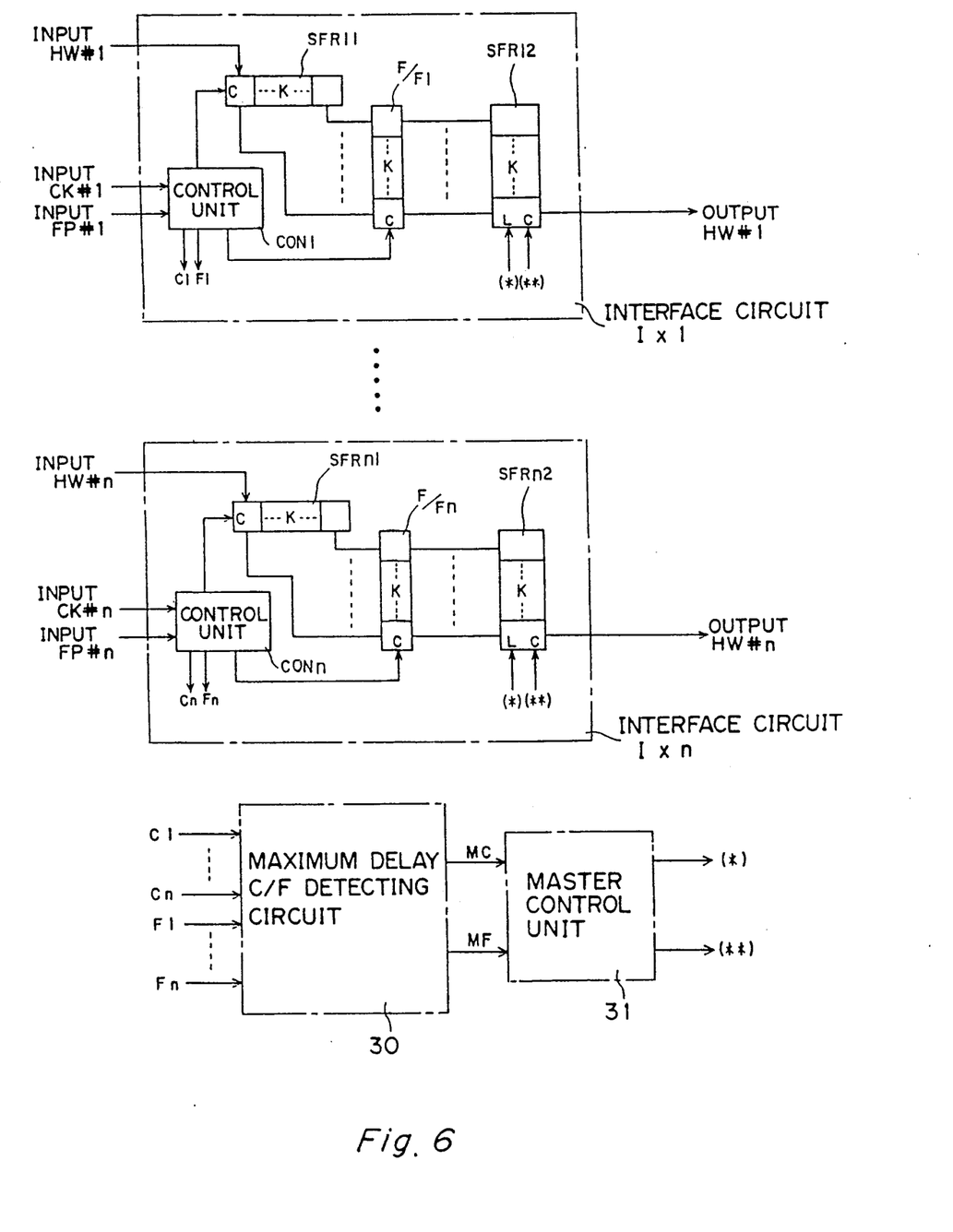
FIG. 6 is a view of an embodiment of the present invention.

FIG. 6 shows a structural view of an embodiment of the present invention.

Interface circuits Ix1 through Ixn correspond to the master clock registers 24-1 through 24-n in FIG. 5.

Control units CON1-CONn produce clocks of shift registers SFR11-SRn1 and registers F/F1-F/Fn (corresponding to the parallel deploying means in FIG. 5) by using a clock pulse and a frame pulse obtained from the input data highway. Inputs HW#1-HW#n of the highway are applied to the data input of registers SFR11-SFRn1 respectively comprising k bits. Clock inputs CK#1-CK#n and frame pulse inputs FP#1-FP#n are respectively applied to control units CON1-CONn. Control units CON1-CONn produce, from a clock and frame pulse, timing clocks at which shift registers SFR11-SFRn1 receive the data of respective highways and apply the timing clocks to clock terminals C of the shift registers. Shift registers SFR11-SFRn1 receive data of the highways at clocks outputted from respective control units CON1-CONn. When shift registers SFR11-SFRn1 receive k bits of data per unit of respective registers, shift registers SFR11-SFRn1 apply serially obtained parallel data to registers F/F1-F/Fn and control units CON1-CONn output receiving clock pulses to registers F/F1-F/Fn. Registers F/F1-F/Fn receive k bits of input data, namely, the output of shift registers SFR11-SFRn1, by using the above receiving clock pulses.

On the other hand, control units CON1-CONn form clocks C1-Cn and frame pulses F1-Fn from inputs CK#1-CK#n and inputs FP#1-FP#n, respectively. Then they apply them to maximum delay clock and frame pulse (C/F) detecting circuit 30. Maximum delay C/F detecting circuit 30 detects the clock and frame pulse subjected to the maximum delay and applies the clock and frame pulse to master control unit 31 as a master clock (MC) and a master frame pulse (MF). Master control unit 31 forms the basic clock (**) and load pulse (*) based on the master clock and the master frame pulse and outputs them to shift registers SFR12-SFRn2.

The above described shift registers SFR12 to SFRn2 receive a parallel output of registers F/F1-F/Fn by using a load pulse of master control unit 31 (SFR12 corresponds, for example, to the latch means 23 in FIG. 5). The k-bit signals are outputted as serial outputs HW#1-HW#n at clocks (**) applied to terminal C of the shift registers SFR12-SFRn2. Shift registers SFR11-SFRn1 sequentially receive the data at a clock provided from the highway and registers F/F1-F/Fn output the received data to shift registers SFR12-SFRn2 at a clock produced by control units CON1-CONn at the same time when k bits of data are received. Shift registers SFR11-SFRn1 receive the above data at a load pulse (*) outputted from master control unit 31. After respective registers F/F1-F/Fn receive data, they maintain the data during the period when shift registers SFR11-SFRn1 receive the following data. Before the data to be inputted next, namely, to be loaded next, is stored in shift registers SFR11-SFRn1, shift registers SFR12-SFRn2 receive data. Thus, the data stored in registers F/F1-F/Fn do not disappear.

Maximum delay C/F detecting circuit 30 detects the most delayed signal from respective control units CON1-CONn and applies the clock and frame pulse to master control unit 31 as a master clock and master frame pulse. Thus, SFR12-SFRn2 simultaneously provide outputs HW#1-HW#n in respective channels in synchronization with the most delayed clock. If the next load data is applied to registers F/F1-F/Fn before the data is loaded in shift registers SFR12-SFRn2, the data disappears. However, even if the phases of respective highways vary within the scope of k bits, the data is received by shift registers SFR12-SFRn2, at a time of the last clock and frame pulse, which is subjected to the maximum delay, and thus the data received by registers F/F1-F/Fn does not disappear. Where data is written before receiving the data because of an error caused upon receiving data when the system is operated, the number of bits of the shift register, namely, the bit number of respective shift registers SFR11-SFRn1, registers F/F1-F/Fn and shift registers SFR12-SFRn2 is increased to provide a bit number greater than the maximum delay, namely, a bit number equal to the reverse-of-integer times m, thereby causing a stable operation.

Figure 7A:
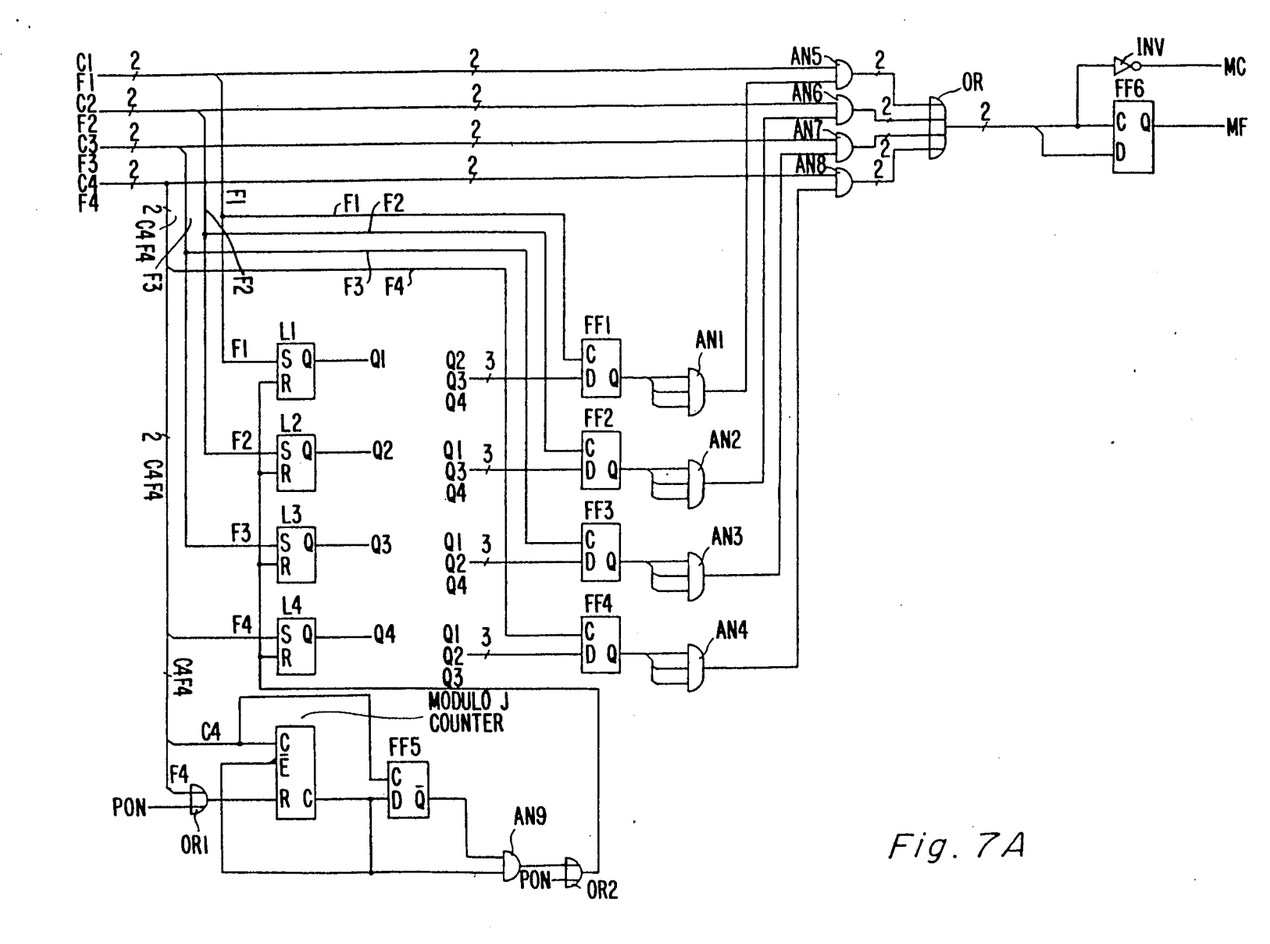
FIG. 7A shows circuit diagram of an actual maximum delay C/F detecting circuit.
Figure 7B:
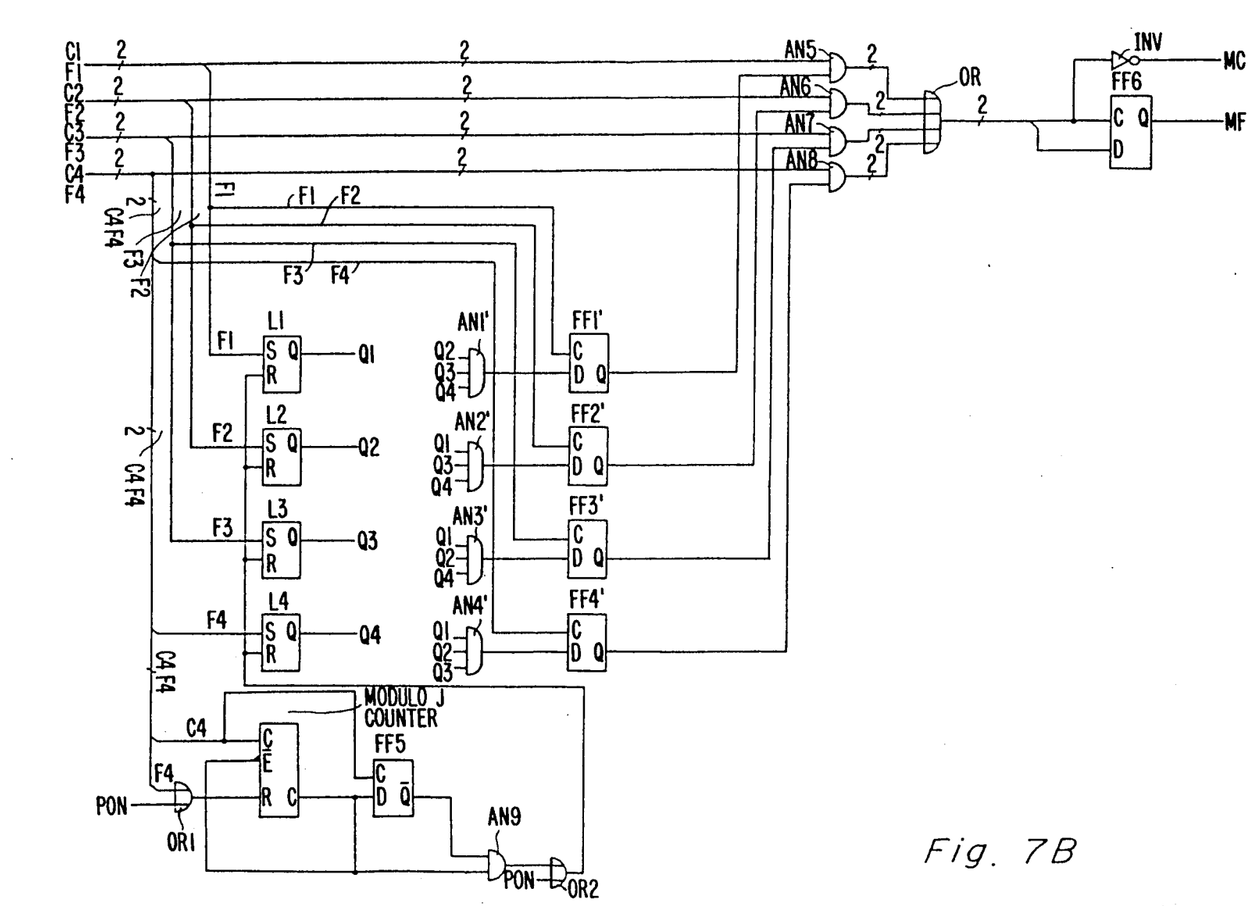
FIG. 7B shows another detailed circuit diagram of a maximum delay C/F detecting circuit.
Figure 8:
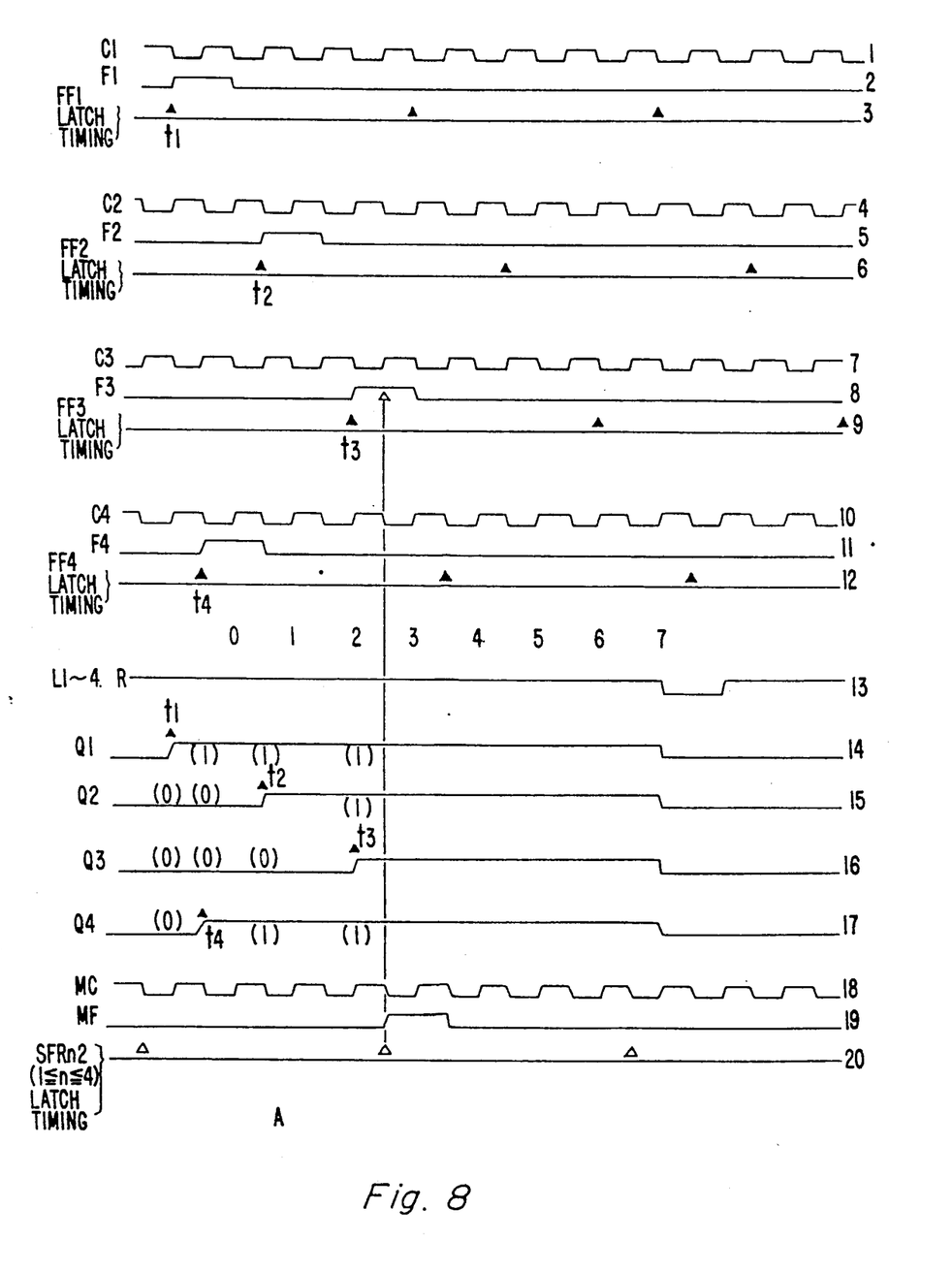
FIG. 8 is a timing chart of the maximum delay C/F detecting circuit.

FIGS. 7A and 7B are detailed circuit diagrams of maximum delay C/F detecting circuit 30, and FIG. 8 is a timing chart of maximum delay C/F detecting circuit 30. FIG. 7A shows a case where 4 interface circuits IX1-IX4 are used. Frame pulses F1-F4 inputted to control units CON1-CON4 corresponding to respective highways, are inputted to the set terminals of set/reset flip-flops L1-L4. The set reset flip-flops L1-L4 are set in accordance with the speed or sequence of the frame pulses F1-F4 and the outputs Q1-Q4 of set/reset flip-flops L1-L4 are turned to a high level as shown in FIG. 8 ⑭ - ⑰.

Frame pulses F1-F4 are simultaneously inputted to clock terminals of flip-flops FF1-FF4. The outputs excluding the corresponding output from outputs Q1-Q4 of set/reset flip-flop L1-L4, are inputted to the data input D of flip-flops FF1-FF4. Namely, the outputs Q2-Q4 of set/reset flip-flops L2, L3 and L4 are applied to flip-flop FF1. Simultaneously, the outputs Q1, Q3 and Q4 of set/reset flip-flop L1, L3 and L4 are applied to flip-flop FF2, as the outputs Q1, Q2 and Q4 of set/reset flip-flop L1, L2 and L4 are applied to the input of flip-flop FF3, and the outputs Q1, Q2 and Q3 are applied to flip-flop FF4. Flip-flops FF1-FF4 are d type flip-flops of 3 bits. Then, only the output of flip-flop FFi corresponding to the most delayed frame pulse is set to the H level, as shown in ⑭ - ⑰ of FIG. 8. For example, if frame pulse F3 is most delayed, outputs Q1, Q2 and Q4 are already set and when a frame pulse is applied to FF3, its output is turned to H level. All the outputs from FF1-FF4 are respectively applied to three inputs of AND gates AN1-AN4. As described above, the output of the AND gate corresponding to the most delayed frame pulse, selected from AND gates AN1-AN4, is turned to a high level. The above is explained in more detail as follows. At first, when frame pulse F1 is produced at a time t1, as shown in the timing chart in FIG. 8, the set/reset flip-flop L1 is set to turn the output Q1 to a high level. Before that, set/reset flip-flops L2-L4 are reset and the output is in an L level "0". Flip-flop FF1, to which the outputs Q2, Q3 and Q4 are applied, receives the L level and provides the L level of the output, thereby maintaining the outputs of the AND gate AN1 at an L level. At time t4, when frame pulse F4 is produced, set/reset flip-flop L4 is set, turning the output to an H level. Outputs Q1, Q2, Q3 (1, 0, 0) of set/reset flip-flops L1, L2 and L3 are applied to flip-flop FF4. Thus, flip-flop FF4 receives the levels of the outputs Q1, Q2 and Q3, and three sets of output of flip-flop FF4 are applied to AND gate AN4. Thus, H, L, L levels (1, 0, 0) are applied to AND gate AN4, thereby maintaining the output of AND gate AN4 at L level. At time t3, the frame pulse is produced. Then data received by flip-flop FF2 is also (1, 0, 1) and the output of AND gate AN2 is maintained at L level.

In the final stage, however, when frame pulse F3 is produced at time t3 as the most delayed pulse, set/reset flip-flop L1, L2 and L4 to which the output of flip flop FF3 is applied are already set. Thus, flip-flop FF3 receives three H levels, and thereby outputs the data to AND gate AN3. As AND gate AN3 receives three H levels, its output is turned to "H level".

The AND gate corresponding to a channel of the most delayed frame pulse produces the H level output. The outputs of AND gates AN1-AN4 are applied to respective ones of the inputs of AND gates AN5-AN8 and the AND gate corresponding to the most delayed frame pulse is turned on. For example, as shown in the timing chart in FIG. 8, the frame pulse F3 is most delayed and AND gate AN7 to which clock C3 and frame pulse F3 are applied is turned on. Thus, the output of AND gate AN7 is received by flip-flop FF6 through OR gate OR as a master frame with a delay of half a pulse as shown in 19 of FIG. 8. Clock C is inverted by inverter INV to be outputted to master control unit 31. The AND gate corresponding to the most delayed frame pulse and selected from AND gates AN5-AN8, are turned on and the frame pulse corresponding the AND gate can be selected.

On the other hand, clock C4 of the fourth highway is applied to the clock terminal of the modulo J counter, (J=8 as shown ⑫ FIG. 8) and frame pulse F4 and power on signal PON are applied to OR gate OR1. The output of OR gate OR1 is connected to a reset terminal of the modulo J counter. Clock pulse C4 is also applied to clock terminal C of flip-flop FF5. A carry output C of modulo J counter CNT is applied to an enable terminal $\bar{E}$ of the J modulo counter and AND gate AN9. The reverse output $\bar{Q}$ of flip-flop FF5 is collected to the other input of AND gate AN9. The output of AND gate AN9 and the power of signal PON are applied to OR gate OR2 and the output of OR gate OR2 is applied to the reset terminal of set/reset flip-flops L1–L4. Modulo J counter CNT forms the reset pulse for resetting set/reset flip-flop L1–L4 and uses clock C4 and frame pulse F4 as the clock input and reset input, respectively. Other clock pulses and frame pulses may be used. It is necessary that J is larger than k and sufficiently smaller than m. The modulo J counter is reset when H level is applied to the reset input, thereby enabling a counting operation. When the J modulo counter counts J, it produces a carry (H level) and the H level is applied to the enable terminal $\overline{E}$ by the H level carry, thereby stopping the counting operation of the counter CNT. The carry output is differentiated by flip-flop FF5 and AND gate AN9 and forms a reset pulse of the set/reset flip-flops L1–L4. The reset pulse is applied to set/reset flip-flops L1–L4 and the clock and frame pulses of the fourth highway are deemed as the earliest, thereby resetting set/reset flip-flops L1–L4.

Namely, there is a possibility that a clock/frame pulse which is not the most delayed one may be selected depending on the starting phase within the initial several frames from the start of the operation of the circuit. However, J is sufficiently smaller than m, so the most delayed clock/frame pulse is stably selected thereafter. In the timing chart shown in FIG. 8, when consideration is started from a position A, no clock/frame can be selected for an initial frame, and C2 and F2 are selected in the following frame, and C3 and F3 are selected in the following frames. If an operation starts when the power is turned on, the modulo J counter is not operated and thus, the output of Q3 is maintained in a high state although Q3 should be reset at a timing "7". When the following frame pulse F2 comes, Q1, Q3 and Q4 become high. Thus, it is judged that frame pulse F2 is the most delayed frame. Then, at a timing "7", Q1 to Q4 are reset. Thus, when the further following frame pulse F2 comes, Q1, Q3 and Q4 becomes (1, 0, 1). When F3 comes immediately after the frame pulse F2, Q1, Q2 and Q4 become (1, 1, 1). Thus, it is duly judged that frame pulse F3 is the most delayed frame.

Respective AND gates AN5–AN8 comprise two AND gates and one of AND gates AN5–AN8 to which the H level outputted from one of AND gates AN1 to AN4 corresponding to the most delayed frame and selected from AND gates AN1–AN4 is applied is turned on and the clock pulse and frame pulse corresponding to the channel is outputted from AND gates AN5–AN8. This clock pulse and frame pulse is applied to inverter INV through flip-flop F/F6. The OR gate comprises separate OR gates for respectively receiving four clock pulses and frame pulses. The clock pulse is outputted as master clock MC from inverter INV. Further, the clock pulse is applied to the clock channel of flip-flop FF6 and performs a control so that the frame pulse is outputted in synchronization with the clock pulse when the frame pulse is applied to that terminal. The output of flip-flop F/F6 is used as master frame pulse MF. It is possible to use the clock and frame pulse outputted from two OR gates as a master clock MC or master frame pulse MF. However, where the frame clock pulse FC is sometimes slightly delayed from the master clock pulse MC, flip-flop FF6 is provided to suppress the difference between the phases.

FIG. 7B is a structural view of another embodiment of the maximum delay C/F detecting circuit. In FIG. 7A, after the output of set/reset flip-flop is received by latches F/F1–F/F4 in of 3-bit units, the maximum delay channel is obtained through the AND gate. In contrast, in FIG. 7B, the output of the corresponding set/reset flip-flop is respectively applied to AND gates AN1'–AN4' first and then when the output of the AND gate corresponding to the most delayed channel is turned to "H", the data is received by one of the flip-flops F/F1'–F/F4'. The structure of FIG. 7B other than that described above is the same as that of the circuits of FIG. 7A. If the circuit of FIG. 7B is used, flip-flops F/F1'–F/F4' may be constructed of a flip-flop of one bit input, thereby decreasing the number of the parts.

The maximum delay designation and detection circuit of the above embodiment correspond to a high speed highway of four channels but the present invention is not limited to the four channel highways. Even if the number of channels increases, the number of flip-flops may be increased to detect the clock and frame pulses of the maximum delay, thereby performing a clock transfer by using them as a master clock and a master frame pulse.

As described above, the present invention performs a clock transfer by using the maximum delay clock and frame pulse and does not need a phase adjustment because of the delay. Therefore, it can accurately perform a clock transfer and change without using an adjustment.

What is claimed is:

1. A phase adjustment circuit using a broad band circuit for adjusting phases of data with each other on a plurality of time divisional high speed highways having different phases, said data including a plurality of frames each of which comprises m bits, m being an integer greater than 1, and having respective frame pulses, said phase adjustment circuit comprising:
    means for providing a master frame pulse based on a frame pulse selected from the respective frame pulses in the high speed highway and delayed in phase by a maximum amount for detecting a time divisional highway having a phase having the greatest delay;
    means for providing a master clock based on a high speed highway clock corresponding to said master frame pulse; and
    means for receiving said plurality of high speed highway data corresponding to said master clock and said master frame pulse.

2. A phase adjustment circuit using a broad band circuit for adjusting phases of data with each other on a plurality of time divisional high speed highways having different phases, said data including a plurality of frames each of which comprises m bits, m being an integer greater than 1, and having respective frame pulses, said phase adjustment circuit comprising:
    parallel deploying means for converting k bits, equal to a maximum phase difference between the time divisional high speed highways, into a parallel signal, k being an integer greater than or equal to 1;
    control means for receiving a clock and a frame pulse from respective ones of the time divisional high speed highways and producing a clock necessary for said parallel deploying means based on the clock and frame pulse;
    latch means for receiving said parallel signal from said parallel deploying means;
    maximum delay detecting means for receiving the clock and frame pulse from said control means and selecting the clock and frame pulse having the greatest phase delay, for detecting a time divisional highway having a phase having the greatest delay and outputting the selected clock and frame pulse as the master clock and master frame pulse, respectively; and clock generating means for generating a clock enabling said latch means to receive said parallel signal from said parallel deploying means based on the master clock and master frame pulses output from said maximum delay detecting means and for applying said clock to said latch means.

3. A phase adjustment circuit according to claim 2, further comprising a plurality of master clock registers, wherein said parallel deploying means, said control means, and said latch means are provided in respective ones of said plurality of master clock registers.

4. A phase adjustment circuit according to claim 2, wherein said latch means converting the parallel signal to a serial signal at a serial output clock generated by said clock generating means and outputting said serial data.

5. A phase adjustment circuit according to claim 2, wherein said parallel deploying means comprises:

serial parallel converting means for receiving serial data from a first clock applied from said control means and outputting the parallel signal; and storing means for receiving the parallel data from said serial parallel converting means at a second clock applied from said control means to be outputted to said latch means.

6. A phase adjustment circuit according to claim 3, wherein said maximum delay detecting means detects a predetermined highway and selects the clock and frame pulse applied from said control means of said master clock register corresponding to the highway which has the greatest delay with respect to data on the predetermined highway.

7. A phase adjustment circuit according to claim 6, wherein said maximum delay detecting means comprises:

set/reset flip-flops corresponding to respective highways and reset by a frame pulse obtained by said control means, based on a signal applied from the predetermined highways;

a first flip-flop corresponding to respective highways and set by the frame pulse obtained by said control means to which the signal is applied from respective highways; and selecting means for selecting the clock and frame pulse of said control means by determining a particular highway to be subjected to the maximum delay when all the outputs of the flip-flops are set except for the one corresponding to the particular highway.

8. A phase adjustment circuit according to claim 7, wherein said set/reset flip-flops are set by differential means for detecting a rising edge or a falling edge of the frame pulse applied by said control means corresponding to the predetermined highway.

9. A phase adjustment circuit according to claim 8, wherein said differential means comprises:

a modulo J counter for counting the clocks being reset by the frame pulse and having an enabling terminal for receiving a carry output;

a second flip-flop for receiving a carry output of said modulo J counter at its input terminal and for receiving a signal of the input terminal at the clock and AND gate for receiving the output of said second flip-flop at its input gate, whereby said set/reset flip-flops are reset by a variation when said modulo J counter counts J clocks.

10. A phase adjustment circuit according to claim 7, wherein said maximum delay detecting means further comprises:

an AND gate for receiving the output of said set/reset flip-flops by excluding the output corresponding to a particular highway; and a third flip-flop for receiving the output of said AND gate at the frame pulse of the corresponding highway, whereby the output of said third flip-flop controls said selection means.

11. A phase adjustment circuit according to claim 7, wherein said maximum delay detecting circuit comprises:

first detecting means provided in accordance with a plurality of highways and for detecting a frame pulse of respective highways;

memory means corresponding to a plurality of highways for storing the output of said first detecting means corresponding to a highway other than a particular highway, in synchronization with the frame pulse of the particular highway;

second detecting means for detecting that the output of said memory means corresponding to highways other than the particular highway is already set when the frame pulse corresponding to the particular highway is input;

means for resetting said first detecting means at every predetermined clock pulse of the predetermined highway; and means for outputting the frame pulse and clock having the greatest delay among the frame pulse and clock in said plurality of highways in accordance with the output of said second detecting means as the master frame pulse and master clock.

* * * * *